US012656933B2

(12) United States Patent
Liu

(10) Patent No.: US 12,656,933 B2
(45) Date of Patent: Jun. 16, 2026

(54) INPUT METHOD, DEVICE, AND STORAGE MEDIUM

(71) Applicant: Beijing Zitiao Network Technology Co., Ltd., Beijing (CN)

(72) Inventor: Chin-Wei Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 131 days.

(21) Appl. No.: 18/545,604

(22) Filed: Dec. 19, 2023

(65) Prior Publication Data

US 2024/0211103 A1 Jun. 27, 2024

(30) Foreign Application Priority Data

Dec. 27, 2022 (CN) .......................... 202211689801.4

(51) Int. Cl.
| | |
|---|---|
| *G06F 3/0482* | (2013.01) |
| *G06F 3/01* | (2006.01) |
| *G06V 40/20* | (2022.01) |

(52) U.S. Cl.
CPC ........... *G06F 3/0482* (2013.01); *G06F 3/011* (2013.01); *G06F 3/017* (2013.01); *G06V 40/28* (2022.01)

(58) Field of Classification Search
CPC ........ G06F 3/0482; G06F 3/011; G06F 3/017; G06F 3/0304; G06F 3/04815; G06F 3/04817; G06F 3/014; G06V 40/28
See application file for complete search history.

(56) References Cited

U.S. PATENT DOCUMENTS

| | | | |
|---|---|---|---|
| 2004/0104941 A1 | 6/2004 | Natoli | |
| 2012/0068941 A1* | 3/2012 | Arrasvuori | G06F 3/04883 |
| | | | 345/173 |
| 2013/0106898 A1 | 5/2013 | Saint-Loubert-Bie et al. | |
| 2018/0028917 A1 | 2/2018 | Poerschke et al. | |
| 2019/0362557 A1 | 11/2019 | Lacey et al. | |
| 2022/0253149 A1* | 8/2022 | Berliner | G06F 3/04883 |
| 2023/0086248 A1* | 3/2023 | Puyol | G06F 9/451 |
| | | | 715/848 |

FOREIGN PATENT DOCUMENTS

| | | |
|---|---|---|
| CN | 106527916 A | 3/2017 |
| CN | 107132917 A | 9/2017 |
| CN | 110442460 A | 11/2019 |

(Continued)

OTHER PUBLICATIONS

China Patent Application No. 202211689801.4; Office Action; dated Mar. 26, 2026; 15 pages.

(Continued)

*Primary Examiner* — Cao H Nguyen
(74) *Attorney, Agent, or Firm* — BakerHostetler

(57) ABSTRACT

An input method, device, and storage medium are provided. The input method includes in response to receiving an input request, displaying an input interface and an auxiliary input object in a target picture, the auxiliary input object being determined on the basis of at least one of an input medium and a distance between the input interface and an operator; receiving an input instruction generated by the input medium using the auxiliary input object to operate the input interface; and inputting information corresponding to the input instruction.

18 Claims, 8 Drawing Sheets

(56) References Cited

FOREIGN PATENT DOCUMENTS

| | | | |
|---|---|---|---|
| CN | 111124116 | A | 5/2020 |
| CN | 113196213 | A | 7/2021 |
| CN | 113703571 | A | 11/2021 |
| CN | 113961107 | A | 1/2022 |
| CN | 114690900 | A | 7/2022 |

OTHER PUBLICATIONS

Point and commit with hands; https://learn.microsoft.com/en-us/windows/mixed-reality/design/point-and-commit; Microsoft; Aug. 2022; accessed Mar. 24, 2026; 13 pages.

* cited by examiner

300

300

310

320

330

400

410

420

430

500

INPUT METHOD, DEVICE, AND STORAGE MEDIUM

CROSS-REFERENCE TO RELATED APPLICATION

The present disclosure claims priority of the Chinese Patent Application No. 202211689801.4 filed on Dec. 27, 2022, the disclosure of which is incorporated herein by reference in its entirety as part of the present application.

TECHNICAL FIELD

The present disclosure relates to an input method, a device, and a storage medium.

BACKGROUND

Extended reality (abbreviated as XR) refers to the combination of reality and virtuality by means of computers to create a virtual environment that allows human-computer interaction. XR technology can further include augmented reality (AR), virtual reality (VR), and mixed reality (MR), which use hardware devices combined with a variety of technical means to integrate virtual content with real scenes.

In related technologies, it is inconvenient to implement input operations in an extended reality system, and the user experience is poor.

SUMMARY

Embodiments of the disclosure provides an input method, comprising:

in response to receiving an input request, displaying an input interface and an auxiliary input object in a target picture, the auxiliary input object being determined on the basis of at least one of an input medium and a distance between the input interface and an operator;

receiving an input instruction generated by the input medium using the auxiliary input object to operate the input interface; and inputting information corresponding to the input instruction.

Embodiments of the disclosure provide an input apparatus, comprising:

a display module, configured to: in response to receiving an input request, display an input interface and an auxiliary input object in a target picture, the auxiliary input object being determined according to at least one of an input medium and a distance between the input interface and an operator;

a receiving module, configured to: receive an input instruction generated by the input medium using the auxiliary input object to operate the input interface; and an input module, configured to: input information corresponding to the input instruction.

Embodiments of the present disclosure provide a computer device, comprising one or more processors, a memory; and one or more programs. The one or more programs are stored in the memory and executed by the one or more processors, and the program comprises instructions for executing the above input method.

Embodiments of the disclosure provide non-volatile computer-readable storage medium comprising a computer program. When the computer program is executed by one or more processors, the processor execute the above input method.

Embodiments of the present disclosure provide a computer program product, comprising computer program instructions. When the computer program instructions run on a computer, the computer executes the above input method.

BRIEF DESCRIPTION OF THE DRAWINGS

In order to provide a clearer explanation of the technical solutions disclosed in this disclosure or related technologies, a brief introduction will be given below to the accompanying drawings required in the embodiments or related technical descriptions. Obviously, the accompanying drawings in the following description are only the embodiments disclosed in this disclosure. For those skilled in the art, other accompanying drawings can be obtained based on these drawings without creative work

DETAILED DESCRIPTION

In order to make the purpose, technical solution, and advantages of this disclosure more clear, detailed explanations of this disclosure, combined with specific embodiments and referring to the accompanying drawings are as follows It should be noted that, unless otherwise defined, the technical or scientific terms used in this disclosed embodiment should have the usual meaning understood by those with general skills in the field to which this disclosure belongs. The terms "first", "second", and similar terms used in this disclosed embodiment do not indicate any order, quantity, or importance, but are only used to distinguish different components. Words such as "comprising" or "including" refer to components or objects that appear before the word, including those listed after the word and their equivalents, without excluding other components or objects. Words like "connection to" or "connection with" are not limited to physical or mechanical connections, but can include electrical connections, whether direct or indirect. "Up", "down", "left", "right", etc. are only used to represent relative positional relationships. When the absolute position of the described object changes, the relative positional relationship may also change accordingly FIG. 1 illustrates a schematic diagram of an exemplary extended reality system 100 provided by the embodiments of the present disclosure.

Figure 1:
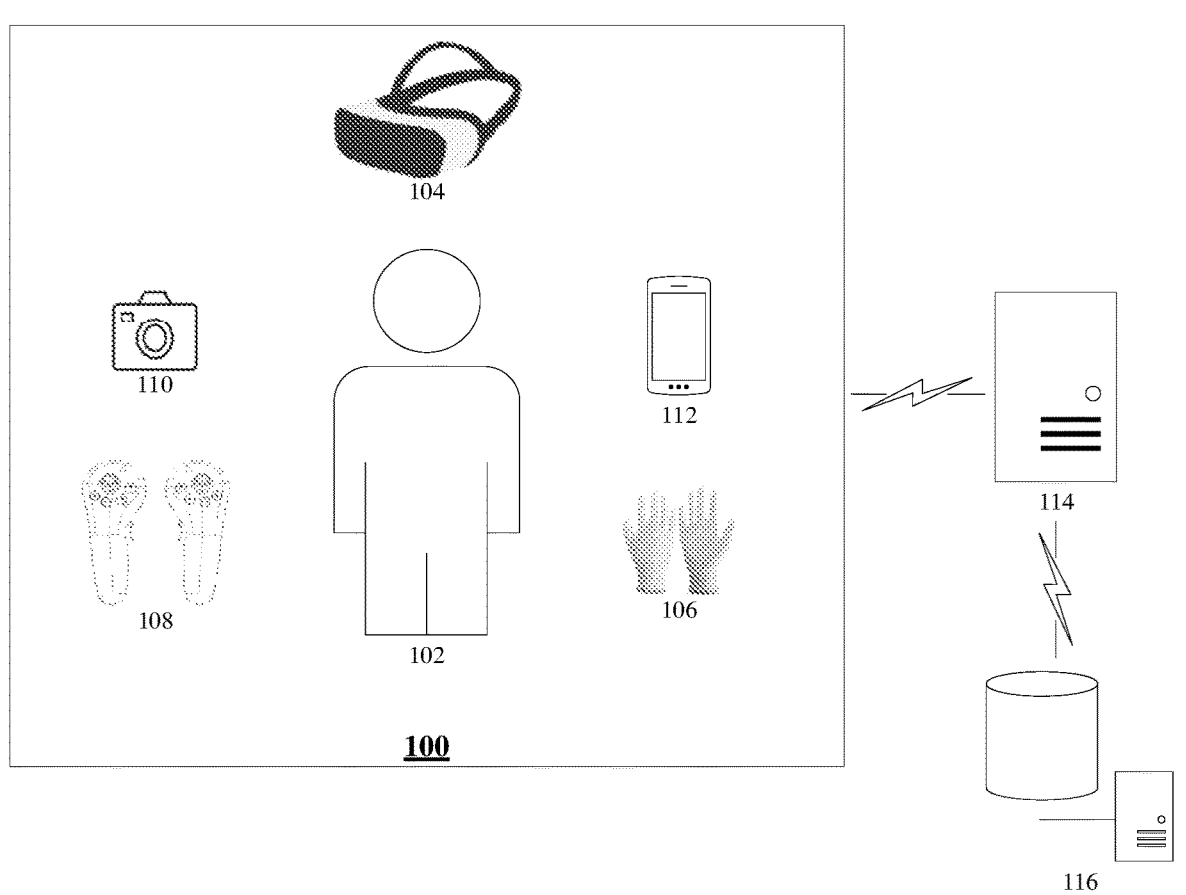
FIG. 1 illustrates a schematic diagram of an exemplary system provided by the embodiments of the present disclosure.

As illustrated in FIG. 1, the system 100 may include a head-mounted wearable device (for example, VR glasses) 104, wearing gloves 106, and operating handles 108. In some scenes, a camera 110 for taking photos of the operator (user) 102 may also be provided. In some embodiments, when the aforementioned devices do not have processing functions, the system 100 may also include an external control device 112 for providing processing functions. The control device 112 may be, for example, a computer device such as a mobile phone or a computer, etc., In some embodiments, when any of the aforementioned devices serves as a control device or a master control device, it can achieve information interaction with other devices in the system 100 by wired or wireless communication methods.

In the system 100, the operator 102 can use the head-mounted wearable device (for example, VR glasses) 104, the wearing gloves 106, and the operating handles 108 to interact with the extended reality system 100. In some scenes, the system 100 can use the pictures collected by the camera 110 to recognize the posture, gesture, and the like of the operator 102, and then complete the interaction with the operator 102 on the basis of the recognized posture and gesture.

In some embodiments, the head-mounted wearable device 104, the wearing gloves 106 and the operating handles 108 may each be provided with a collection unit for collecting information. There can be multiple types of collection units. For example, the head-mounted wearable device 104 may be provided with a camera or a charge-coupled device (CCD) image sensor for collecting human eye images, a speed sensor, an acceleration sensor or an angular velocity sensor (for example, a gyroscope) for collecting speed information or acceleration information of the head-mounted wearable device 104, an electrode for collecting brain wave information, a neuromuscular sensor for collecting neuromuscular response information, a temperature sensor for collecting body surface temperature, and the like. For another example, the wearing gloves 106 may also be provided with a speed sensor, an acceleration sensor or an angular velocity sensor (for example, a gyroscope) for collecting speed information or acceleration information of the wearing gloves 106, a neuromuscular sensor for collecting neuromuscular response information, a temperature sensor for collecting body surface temperature, and the like. It should be noted that, in addition to being provided on the head-mounted wearable device 104 and the wearing gloves 106, the aforementioned collection units can also be provided on the operating handles 108 of FIG. 1, or provided on the body part of the interactive operator 102 without hardware equipment but directly through attachment, thereby collecting relevant information of the body part, such as speed or acceleration or angular velocity information, or biological information (for example, human eye images (containing pupil images), neuromuscular response information, brain wave information, body surface temperature, and the like) collected by other sensors or collection units.

In some embodiments, the system 100 can recognize the postures, gestures and the like of the operator 102 through the collected information so as to perform corresponding interactions.

In some embodiments, as illustrated in FIG. 1, the system 100 can also communicate with the server 114 and can acquire data such as pictures, audios and videos and the like from the server 114. In some embodiments, as illustrated in FIG. 1, the server 114 can retrieve required data such as pictures, audios, and videos and the like from the database server 116 used to store data.

The extended reality (XR) system 100 may allow the operator 102 to interact with the digital world in a simulated scene. The simulated scene can be a virtual scene or a scene that combines virtuality and reality. In some cases, the operator 102 may be required to input some information in the simulated scene to complete the interaction.

In related technologies, the input method performs input of the triggerable objects in the input interface in the simulated scene mainly by clicking buttons on the operating handles 108. It can be seen that this input method needs to rely on operating handles to realize input, and the operation is inconvenient.

In view of this, embodiments of the present disclosure provide an input method. A corresponding auxiliary input object is displayed according to the input medium and/or the distance between the input interface and the operator in the simulated scene, and then the input instruction generated by the input medium operating the auxiliary input object is received to input corresponding characters, so that different input modes can be used to complete input when the distances between the current input media and/or the input interface and the operator are different, thus facilitating the operation of the user.

Figure 2:
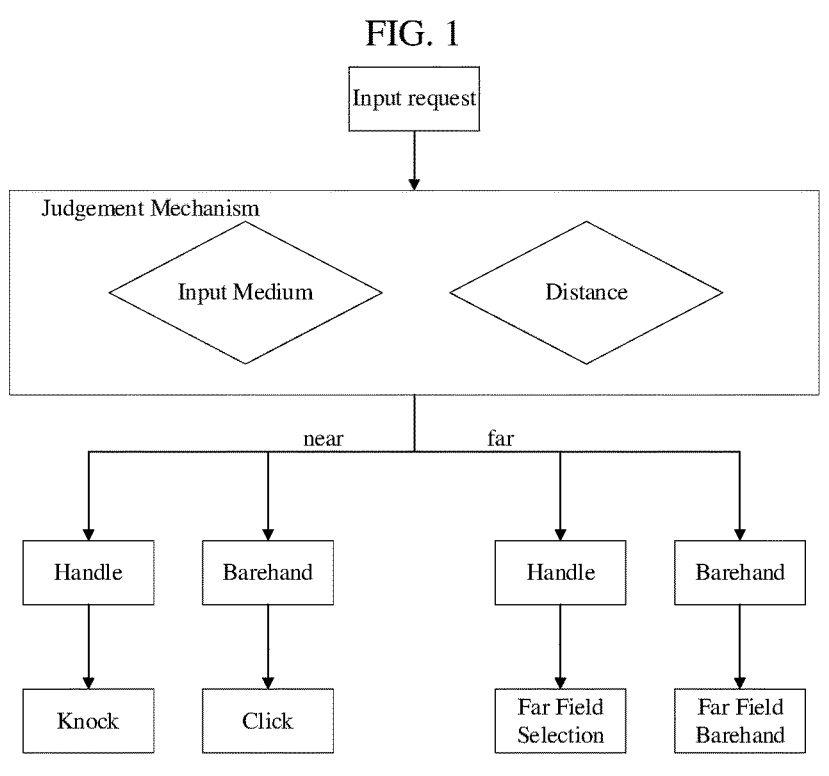
FIG. 2 illustrates a schematic diagram of an exemplary process according to the embodiments of the present disclosure.

FIG. 2 illustrates a schematic diagram of an exemplary method 200 according to the embodiments of the present disclosure.

As illustrated in FIG. 2, the method 200 can be used by the operator 102 to input information in a simulated scene, and can be implemented by a device having processing capabilities in the system 100. As an optional embodiment, the method can be implemented by the head-mounted wearable device 104.

As mentioned above, the operator 102 can use the extended reality system 100 to interact with the digital world in the simulated scene. During this process, there may be scenes where the operator 102 needs to input information. For example, the simulated scene provides a digital world that simulates the human society, where a variety of operable objects such as a street store can be included. The user obtains some services by interacting with these operable objects. For example, the user can purchase some virtual products in the store. Assuming that the user clicks on the store so as to enter the service interface provided by the store, the user may need to input some information in the service interface. Therefore, it can be understood that the click operation generates an input request, and the service interface can be an input interface.

Figure 3A:
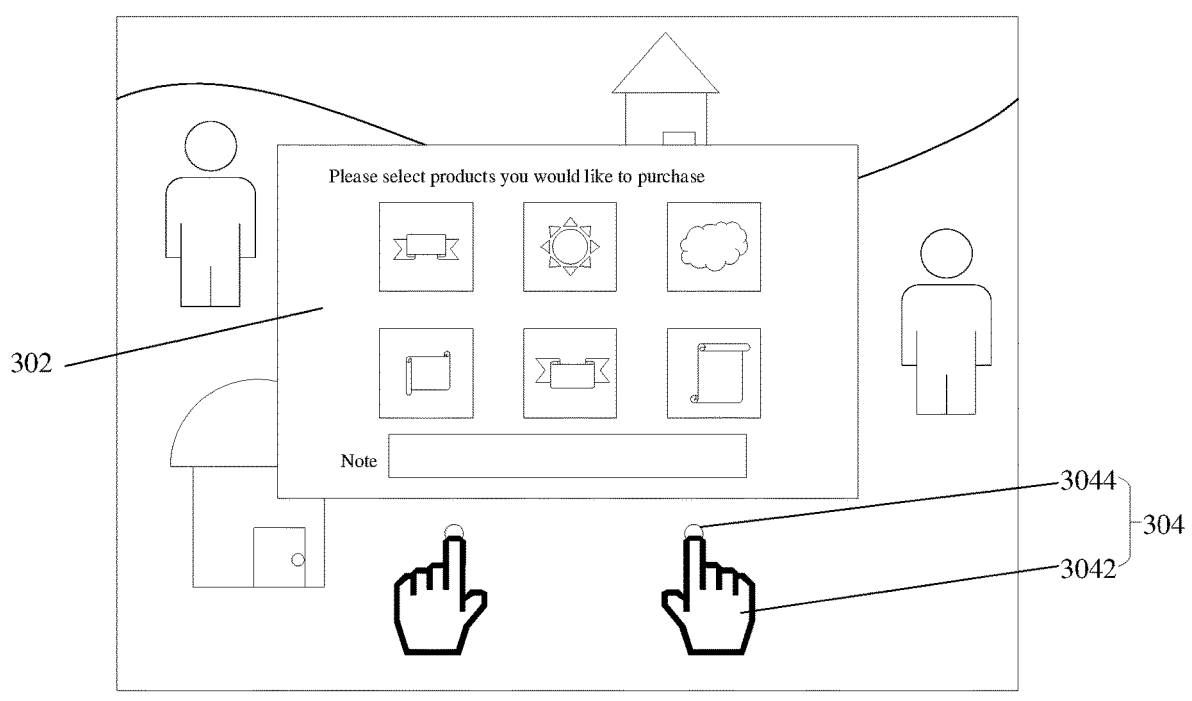
FIG. 3A illustrates a schematic diagram of an exemplary picture according to the embodiments of the present disclosure.

FIG. 3A illustrates a schematic diagram of an exemplary picture 300 according to the embodiments of the present disclosure.

The picture 300 may be a picture viewed by the operator 102 through the head-mounted wearable device 104. As illustrated in FIG. 3A, the picture 300 shows a digital world in a simulated scene, where when an input request (for example, clicking on a certain store in the simulated scene) is received, an input interface 302 (the service interface corresponding to the store) can be displayed in the picture 300.

In some embodiments, multiple triggerable objects may be displayed in the input interface 302. For example, as illustrated in FIG. 3A, icons of products available for purchase may be displayed in the service interface of the store, and these icons may generate corresponding input instructions (for example, instructions to purchase a certain product) after being triggered. Therefore, these icons can be considered as the triggerable objects. In some embodiments, as illustrated in FIG. 3A, the triggerable object may also be an input field, for example, an input field for the user to input remarks.

After receiving the input request, in some embodiments, in order to facilitate the operator 102 to select or trigger the triggerable object, the auxiliary input object may also be displayed to assist the operator in completing the input operation.

In related technologies, the input interface 302 is generally formed at a position (which can be called a far field) far away from the operator 102. As such, in terms of visual effects, the input interface 302 will be smaller relative to the picture 300 (as illustrated in FIG. 3C), thus causing the user operation to be inconvenient. It should be emphasized that currently common solutions in the present art are to use far-field methods to display the input interface 302, and there is no near-field input method. Moreover, in related technologies, hardware input devices (for example, operating handles) are generally used to implement input, and barehand input is not supported.

Considering the above situation, in some embodiments, the auxiliary input object can be designed respectively according to whether the input interface 302 is at a far position (far field) or at a near position (near field) and the input medium used by the operator 102. As such, the operator 102 can use the corresponding auxiliary input object to operate the input interface through the input medium (for example, an operating handle or a hand) so as to generate an input instruction, thereby inputting information corresponding to the input instruction in the simulated scene.

In some embodiments, if the distance between the input interface and the operator is less than the first distance, the auxiliary input object may include a first object for operating the input interface. If the distance between the input interface and the operator is greater than the second distance, the auxiliary input object may include a second object for operating the input interface. As such, when the distances between the input interface and the operator are different, different auxiliary input objects can be used to assist in implementing input instructions, so that different auxiliary input objects can achieve good operation experiences respectively in different scenes (far field or near field), thus improving operation efficiency. It can be understood that the aforementioned first distance and second distance can be set according to actual needs, and the specific values are not limited. As an example, the first distance may be 35 cm, and the second distance may be 50 cm (or any other value, mainly the length of an arm). The distance between the input interface and the operator can be calculated on the basis of the projection relationship of the three-dimensional world reflected in the image, where the position of the operator 102 can be based on the most front-end plane, and then when the most front-end plane and the input interface are projected into the three-dimensional space, the distance between them is calculated. In some embodiments, the distance between the input interface and the operator can also be calculated on the basis of the distance between a certain body part (for example, hand or finger, face or eyes, etc.) of the operator and the input interface. For the specific calculation, please refer to the methods mentioned above, and no further detail will be given herein.

In some embodiments, if the distance between the input interface and the operator is less than the first distance, the first object as the auxiliary input object may be different according to different input media.

As illustrated in FIG. 3A, if the input medium is a hand of the operator, the first object 304 may include a hand shape image 3042 and a pointing point 3044 located at the front end of the hand shape image 3042. The hand shape image 3042 can be used to reflect the position of the hand of the operator 102 in the simulated scene, so that the operator 102 can perform operations on the basis of the hand shape image 3042. The pointing point 3044 at the front end of the hand shape image 3042 can be used as the point where the hand shape image 3042 comes into contact with a specific object in the simulated scene. As such, when determining whether the operator 102 triggers a certain triggerable object of the input interface 302, it can be judged according to the position of the pointing point 3044. It can be understood that since the hand shape image 3042 occupies a large area, misjudgment may occur when determining whether the gesture of the operator 102 is in contact with an object in the simulated scene. After additionally providing the pointing point 3044, the operation can be made more accurate.

In some embodiments, the shape of the hand shape image 3042 may not be fixed. For example, a corresponding hand shape image may be generated according to the currently recognized gesture of the operator 102 in the real physical world. As an optional embodiment, in order to recognize the gesture of the operator 102 in the real physical world, the camera 110 illustrated in FIG. 1 can be used to collect the image of the operator 102 or the image of the hand of the operator 102, or the head-mounted wearable device 104 can be provided with a camera that captures images of the environment. Next, the camera can be used to collect images of the hand of the operator 102, then the current posture of the hand of the operator 102 is recognized according to the collected images, and the corresponding hand shape image 3042 is generated on the basis of the posture and displayed in the picture 300, thereby increasing the sense of reality of the operator 102 in the simulated scene and improving the user experience. It can be understood that since the shape of the hand shape image 3042 is not fixed, the operation accuracy can be improved by providing the pointing point 3044.

Next, the operator 102 can use his/her hands to perform input operations. For example, in the state illustrated in FIG. 3A, the current positions of the pointing point and the input interface may be first determined as the initial positions. Then, the operator 102 can move his hands forward. Accordingly, the system 100 performs recognition by collecting in real time the image of the operator 102 or the image of the hands of the operator 102, and determines the moving distance and moving direction of the hands of the operator 102 in the real physical world according to the recognition result. The moving distance and moving direction are then mapped to the simulated scene illustrated in FIG. 3A so as to determine the moving distance and moving direction of the hand shape image 3042. The current position of the pointing point 3044 is then determined according to the moving distance and moving direction so as to determine whether the pointing point 3044 is in contact with the triggerable object on the input interface 302 according to the current position of the pointing point 3044. If it is determined that the pointing point 3044 is in contact with the triggerable object on the input interface 302, a corresponding input instruction is generated according to the contacted triggerable object.

Figure 3B:
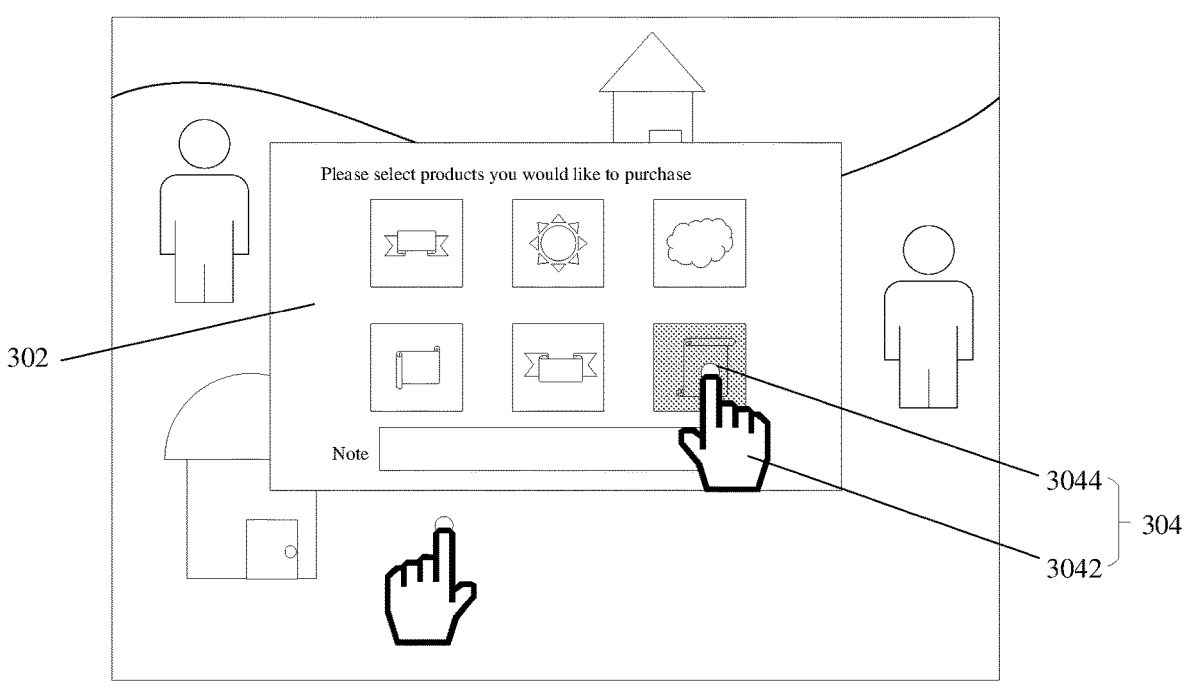
FIG. 3B illustrates a schematic diagram of an exemplary picture according to the embodiments of the present disclosure.
Figure 3C:
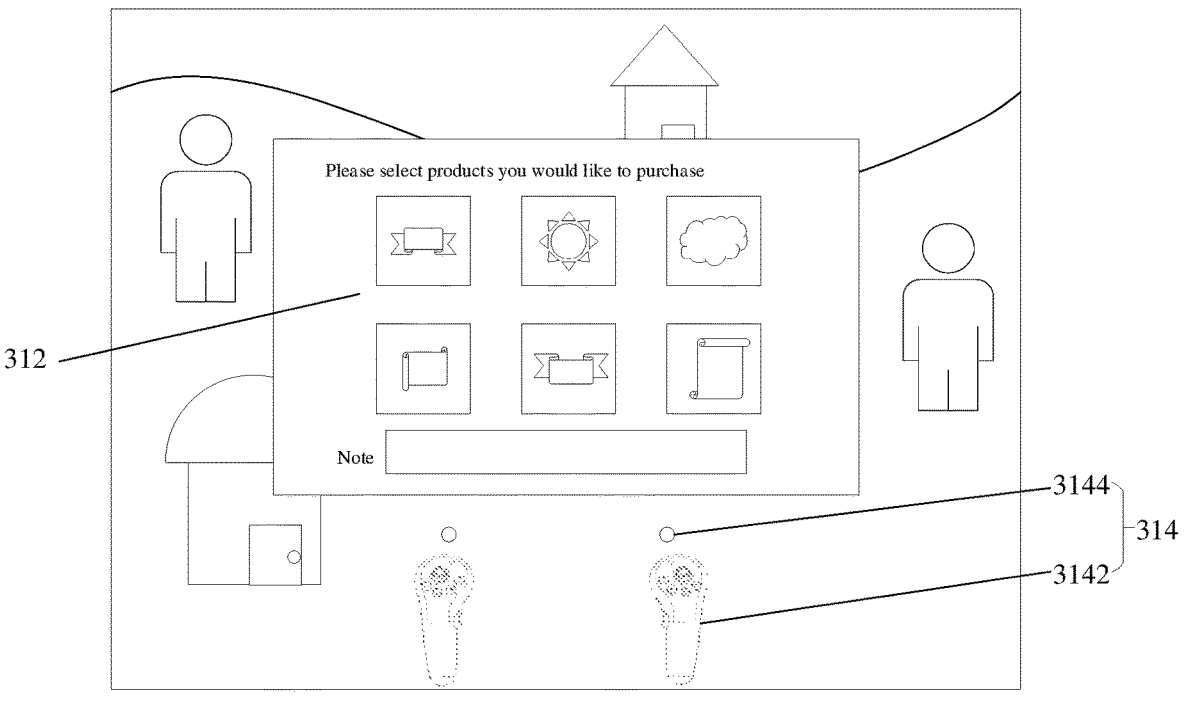
FIG. 3C illustrates a schematic diagram of an exemplary picture according to the embodiments of the present disclosure.

FIG. 3B illustrates a schematic diagram of an exemplary picture 300 according to the embodiments of the present disclosure.

As illustrated in FIG. 3B, after the hand shape image 3042 moves forward, the pointing point 3044 is in contact with a triggerable object on the input interface 302, and a corresponding input instruction can be generated according to the contacted triggerable object. As illustrated in FIG. 3B, in some embodiments, after it is detected that the pointing point 3044 is in contact with a triggerable object, the triggerable object can be highlighted to serve as a prompt. As illustrated in FIG. 3B, in some embodiments, the position of the hand shape image 3042 in the picture 300 can change in real time according to changes in the positions of the hands of the operator 102 in the real physical world so as to help the user understand the current movement of the hands in the simulated scene.

As shown, the foregoing embodiments realize the bare-hand input solution of the operator and expand the scope of application, thus helping improve the user experience. Moreover, when the input interface is in the near field, the above embodiments can realize input by contacting the input interface 302 with bare hands, thus improving the sense of reality and providing a better user experience.

As an optional embodiment, in a near-field input scene, if the input medium is a hardware input device (for example, an operating handle), the first object as the auxiliary input object may be different from the aforementioned first object, so that different scenes are distinguished by different first objects, thus increasing system richness and improving user experience.

FIG. 3C illustrates a schematic diagram of an exemplary picture 310 according to the embodiments of the present disclosure.

As illustrated in FIG. 3C, the input medium is a hardware input device (for example, the operating handles 108), and the first object 314 includes an image 3142 corresponding to the hardware input device and a pointing point 3144 located at the front end of the image. The image 3142 may be used to reflect the location of the hardware input device in the simulated scene, so that the operator 102 can perform operations on the basis of the image 3142. The pointing point 3144 at the front end of the image 3142 can be used as the point where the image 3142 comes into contact with a specific object in the simulated scene. As such, when determining whether the operator 102 triggers a certain triggerable object of the input interface 312, it can be judged according to the position of the pointing point 3144. It can be understood that since the image 3142 occupies a large area, misjudgment may occur when determining whether an object in the simulated scene is contacted. By additionally providing the pointing point 3144, the operation is made more accurate.

In some embodiments, the posture and position of the image 3142 may change in real time according to changes in the hardware input device in the physical world. For example, the corresponding image 3142 may be generated according to the currently recognized posture and position of the hardware input device in the real physical world. As an optional embodiment, in order to recognize the posture and position of the hardware input device in the real physical world, the camera 110 illustrated in FIG. 1 can be used to collect the image of the operator 102 or the image of the hardware input device held by the operator 102, or the head-mounted wearable device 104 can be provided with a camera that captures images of the environment. Next, the camera can be used to collect images of the hardware input device held by the operator 102, then the current posture and position of the hardware input device is recognized according to the collected images, and the corresponding image 3142 is generated on the basis of the posture and position and displayed in the picture 310, thereby increasing the sense of reality of the operator 102 in the simulated scene and improving the user experience. It can be understood that since the posture of the image 3142 is not fixed, by providing the pointing point 3144, the operation accuracy can be improved.

Next, the operator 102 can use the hardware input device to implement input operations. For example, in the state illustrated in FIG. 3C, the current positions of the pointing point and the input interface may be first determined as the initial positions. Then, the operator 102 can move the hardware input device forward. Accordingly, the system 100 performs recognition by collecting in real time the image of the operator 102 or the image of the hardware input device, and determines the moving distance and moving direction of the hardware input device in the real physical world according to the recognition result. The moving distance and moving direction are then mapped to the simulated scene illustrated in FIG. 3C so as to determine the moving distance and moving direction of the image 3142. Then, the current position of the pointing point 3144 is determined according to the moving distance and moving direction so as to determine whether the pointing point 3144 is in contact with the triggerable object on the input interface 312 according to the current position of the pointing point 3144. If it is determined that the pointing point 3144 is in contact with the triggerable object on the input interface 302, corresponding input instructions are generated according to the contacted triggerable object.

As an optional embodiment, as mentioned above, when the hardware input devices are the operating handles 108, a speed sensor, an acceleration sensor or an angular velocity sensor (for example, a gyroscope) for collecting speed information or acceleration information can be provided. Therefore, the aforementioned moving distance and moving direction can be calculated using the information collected by the speed sensor, acceleration sensor, and angular velocity sensor (for example, gyroscope) without processing through image recognition.

In some embodiments, the hardware input device may also be wearing gloves 106. It can be understood that the information collected by the wearing gloves can simulate the posture of the hands of the operator 102. Therefore, when the hardware input devices are the wearing gloves 106, when the image of the hardware input device is being displayed, the image can be simulated as a hand shape image (rather than an image of wearing gloves), thereby improving the sense of reality.

It can be seen from the above embodiments that some embodiments of the present disclosure can design different input integration solutions by combining two different control methods: the hardware control method and the barehand control method, thus expanding the scope of application of the product and improving the user experience.

In some embodiments, if the distance between the input interface and the operator is greater than the second distance, the second object as the auxiliary input object may also be different according to different input media.

Figure 3D:
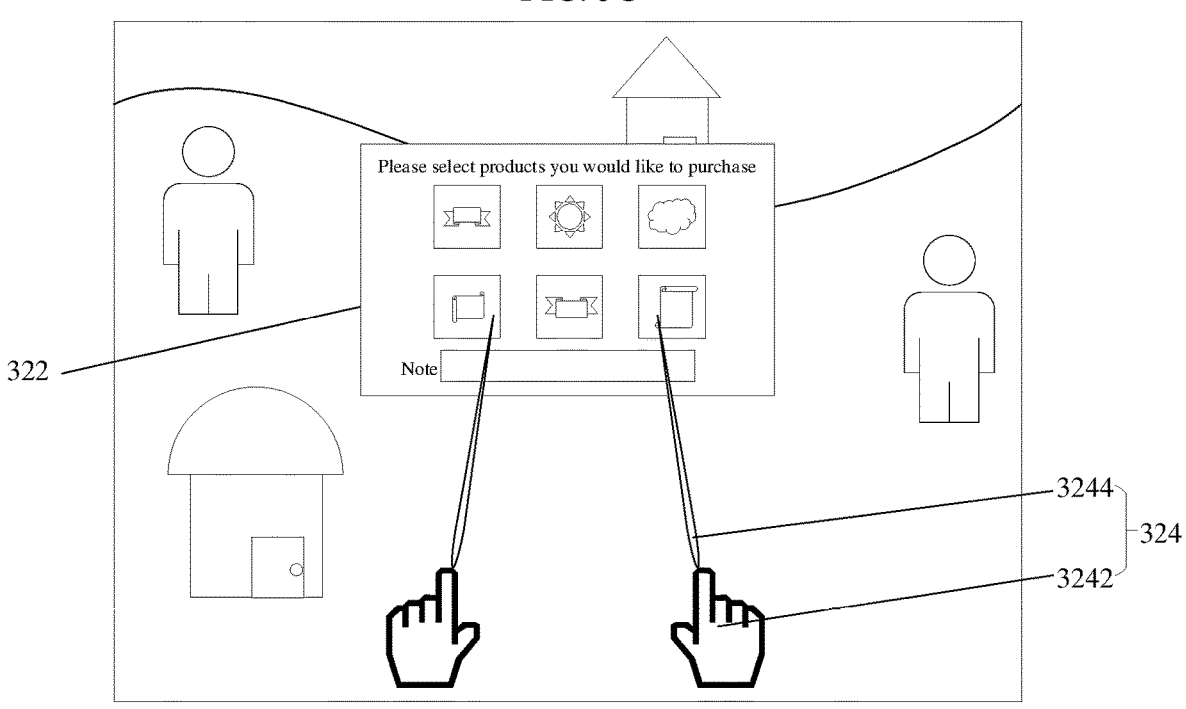
FIG. 3D illustrates a schematic diagram of an exemplary picture according to the embodiments of the present disclosure.

FIG. 3D illustrates a schematic diagram of an exemplary picture 320 according to the embodiments of the present disclosure.

As illustrated in FIG. 3D, if the input medium is a hand of the operator, the second object 324 may include a hand shape image 3242 and a ray 3244 pointing from the hand shape image to the input interface. The hand shape image 3242 can be used to reflect the position of the hand of the operator 102 in the simulated scene, so that the operator 102 can perform operations on the basis of the hand shape image 3242. The front end of the ray 3244 can be used as the point where the hand shape image 3242 comes into contact with a specific object in the simulated scene. As such, when determining whether the operator 102 triggers a certain triggerable object of the input interface 322, it can be judged according to the position of the front end of the ray 3244. It can be understood that since the input interface 322 is far away from the operator 102, the operator 102 cannot operate the input interface 322 by clicking. The ray 3244 can be used to aim at the corresponding triggerable object, thus serving as an indicator.

It can be understood that the ray 3244 can serve as an indicator. In some embodiments, the input medium can be used to adjust the direction of the ray 3244 so that the front end of the ray 3244 can move between different triggerable objects.

In some embodiments, the shape of the hand shape image 3242 may not be fixed. For example, a corresponding hand shape image may be generated according to the currently recognized gesture of the operator 102 in the real physical world. As an optional embodiment, in order to recognize the gesture of the operator 102 in the real physical world, the camera 110 illustrated in FIG. 1 can be used to collect the image of the operator 102 or the image of the hand of the operator 102, or the head-mounted wearable device 104 can be provided with a camera that captures images of the environment. Next, the camera can be used to collect images of the hands of the operator 102, the current posture of the hand of the operator 102 is recognized according to the collected images, and the corresponding hand shape image 3242 is generated on the basis of the posture and displayed in the picture 300, thereby increasing the sense of reality of the operator 102 in the simulated scene, to improve the user experience.

As mentioned above, when the operator 102 performs the input operation with bare hands, the gesture of the operator 102 can be recognized through image recognition, thereby implementing the corresponding operation. As an optional embodiment, whether the ray 3244 needs to be displayed may be determined by recognizing the hand posture of the operator 102. For example, when it is recognized that the hand posture of the operator 102 is that the index finger is forward and the other fingers are curled up, it is regarded that the operator 102 currently needs to perform an input operation, thereby displaying the ray 3244. Moreover, the rear end of the ray 3244 is in contact with the end of the index finger of the hand shape image 3242, thereby forming a ray extending from the end of the index finger to the input interface 322, which can better help the operator 102 select triggerable objects from the perspective of auxiliary operations.

In some embodiments, both the movement of the hand shape image 3242 and the movement of the ray 3244 can be accomplished using the aforementioned image recognition method. Moreover, the moving distance and moving direction can be determined on the basis of image recognition, which will not be repeated here.

Since the input interface 322 is far away and the front end of the ray 3244 is unstable when moving (the pointing may not be accurate), in some embodiments, when the ray 3244 points to a triggerable object, it will not trigger the object directly. Rather, it is required to wait for the operator 102 to issue a selection instruction before the object can be triggered.

Therefore, upon performing an input operation, when the operator 102 selects a triggerable object (the front end of the ray 3244 points to the triggerable object) using the movement of his hands, a specific gesture can be used to generate a selection instruction. In some embodiments, at least two frames of target pictures (for example, the picture displayed by the device 104) can be acquired, then at least two frames of hand shape images are respectively recognized from the at least two frames of target pictures, and the gesture of the operator is recognized according to the at least two frames of hand shape images. If the recognized gesture of the operator matches the first preset gesture (for example, a pinch gesture), it can be determined that the selection instruction is received.

Figures 3E, 3F:
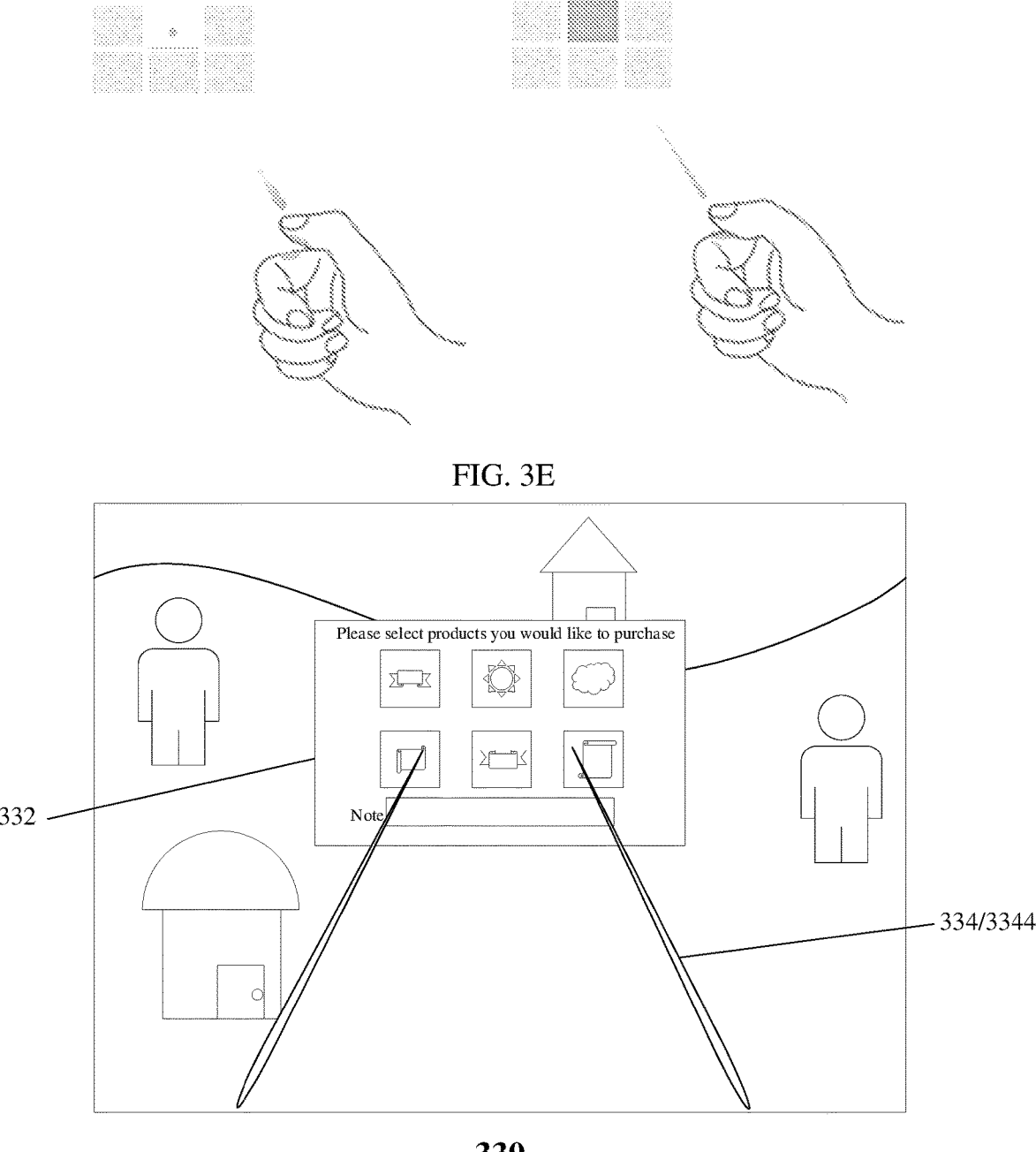
FIG. 3E illustrates a schematic diagram of an exemplary gesture according to the embodiments of the present disclosure.
FIG. 3F illustrates a schematic diagram of an exemplary picture according to the embodiments of the present disclosure.

FIG. 3E illustrates a schematic diagram of an exemplary gesture according to the embodiments of the present disclosure.

As illustrated in FIG. 3E, it can be determined that according to the hand shape image in the two frames of images, the current gesture of the operator is a pinch gesture, thereby determining that the operator 102 has issued a selection instruction. Then, an input instruction can be generated according to the triggerable object pointed by the current ray 3244, thereby inputting the information corresponding to the input instruction.

It can be understood that the first preset gesture can be any gesture and is not limited to the aforementioned pinch gesture. However, when the pinch gesture is used, the operator 102 can point the index finger to the selected triggerable object and perform the pinch operation with the thumb. The input operation can be completed with one hand, which is convenient to use.

As an optional embodiment, in a far-field input scene, if the input medium is a hardware input device (for example, an operating handle), the second object as the auxiliary input object may be different from the aforementioned second object, so as to distinguish different scenes by different second objects, thereby increasing system richness, which improves user experience.

FIG. 3F illustrates a schematic diagram of an exemplary picture 330 according to the embodiments of the present disclosure.

As illustrated in FIG. 3F, if the input medium is a hardware input device, the second object 334 may include a ray 3344 pointing to the input interface 332. Optionally, as illustrated in FIG. 3F, the ray 3344 may be a ray extending from the bottom of the picture to the input interface 332.

As an optional embodiment, the moving distance and moving direction of the ray 3344 can be obtained using the aforementioned image recognition or by calculation according to the data collected by the sensor. No further detail will be given herein.

It can be understood that, similar to the foregoing embodiments, since the input interface 332 is far away and the front end of the ray 3344 is unstable when moving (the pointing is not necessarily accurate), in some embodiments, when the ray 3344 points to a certain triggerable object, the object will not be triggered directly. Rather, it is required to wait for the operator 102 to issue a selection instruction before the object can be triggered.

As an optional embodiment, if the hardware input devices are the operating handles 108, selection instructions can be issued by pressing the confirmation buttons on the handles 108. As another optional embodiment, if the hardware input devices are the wearing gloves 106, selection instructions can be issued by using the aforementioned pinch gesture. During specific implementation, the design can be carried out as required.

Comparing the far-field and near-field input methods, it can be understood that during far-field input, a ray will be emitted, and the top of the ray will be used as the anchor point. The anchor point is selected on the triggerable object, and the selection is made after clicking the confirmation button or using the pinch gesture. In this method, because the ray distance is long, the far-field control may cause the input point to shake due to the long arm of force, the operator may feel unsafe in the input and the accuracy of the input may be affected. Therefore, as an optional embodiment, when the input interface is displayed in the picture, the default state may be the near-field input mode, for example, the modes (which are different according to different input media) illustrated in FIG. 3A and FIG. 3C.

It can be understood that some operators may need to adjust the distance of the input interface (so that the input interface is displayed at a position of a specific distance where the operator may feel comfortable to observe) due to different usage habits, or they may want to realize input using a far-field mode. Therefore, in some embodiments, a method of adjusting the distance of the input interface may be provided.

As an optional embodiment, a button for adjusting the distance of the interface can be provided on the input interface, and the distance of the input interface can be adjusted by clicking the button. Optionally, there can be two such buttons, one for pushing the interface away and the other for bringing the interface closer. By clicking the corresponding button, the interface can be pushed away or brought closer.

Optionally, when the operator 102 realizes input with bare hands, gestures can be used to adjust the distance of the input interface. When the operator 102 uses a hardware input device to realize input, there can be two specific cases: if the hardware input device is provided with buttons (for example, the operating handles 108), the specific buttons can be used to adjust the distance of the input interface; if the hardware input device does not have buttons (for example, wearing gloves 106), gestures can be used to adjust the distance of the input interface.

As an optional embodiment, the operating handles 108 can be provided with a trigger for starting the distance adjustment mechanism and a joystick for adjusting the distance. The operator 102 can press the start trigger and then move the joystick forward or backward to control the distance of the input interface. For example, when the joystick is moved forward, the input interface can be pushed further away, and when the joystick is moved backward, the input interface can be brought closer.

As an optional embodiment, gestures can be used to adjust the distance of the input interface in both bare-hand and gloves-wearing scenes. Optionally, the head-mounted wearable device 104 may acquire at least two frames of the target picture and respectively recognize at least two frames of hand shape images from the at least two frames of the target picture, and then recognize the gesture of the operator according to the at least two frames of hand shape images. If it is determined that the gesture of the operator matches the second preset gesture, the input interface is moved in the current target picture according to the gesture of the operator. For specific recognition methods, reference may be made to the foregoing embodiments, and no further detail will be given herein.

Figure 3G:
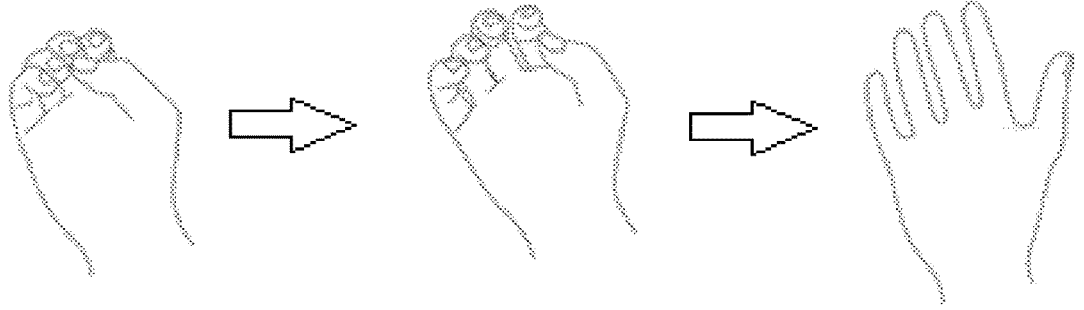
FIG. 3G illustrates a schematic diagram of an exemplary gesture according to the embodiments of the present disclosure.

It can be understood that when recognizing whether the gesture of the operator matches the second preset gesture, the second preset gesture can be set as required. As an optional embodiment, the input interface can be gradually brought closer or pushed further away by gradually turning the unfolded palm into a first or gradually unfolding the first gesture, as illustrated in FIG. 3G. As another optional embodiment, the pinch gesture (as illustrated in FIG. 3E) plus dragging can be used to bring the input interface closer, or the palm gesture can be pushed forward so as to push the input interface further away.

In some embodiments, the moving distance of the input interface can also be determined according to the recognized gesture, for example, the distance is calculated according to the degree to which the palm is unfolded or clenched. For another example, the distance the input interface is brought closer is calculated according to the distance the pinch gesture is brought closer, the distance the input interface is pushed further away is calculated according to the distance the palm is pushed, and so on.

As such, the input interface can be brought closer or pushed further away, and the operation is also very convenient.

According to what has been described above, embodiments of the present disclosure provide multiple input modes, and pushing the input interface further away or bring the input interface closer are implemented. Therefore, in some embodiments, when the distance between the operator and the input interface changes by entering the far field (greater than the second distance) from the near field or by entering the near field (less than the first distance) from the far field, the auxiliary input object in the displayed picture can be switched. For example, when the operator uses the barehand input method, upon entering the far field from the near field, FIG. 3A can be switched to the picture illustrated in FIG. 3D; otherwise, FIG. 3D can be switched to the picture illustrated in FIG. 3A). Similarly, when the operator uses a hardware input device to realize input, upon entering the far field from the near field, FIG. 3C can be switched to the picture illustrated in FIG. 3F; otherwise, FIG. 3F can be switched to the picture illustrated in FIG. 3C.

As an optional embodiment, the following steps may be specifically adopted to implement the aforementioned switching:

determining the distances between the input interface and the operator before movement and after movement; and in response to determining that the distances between the input interface and the operator before movement and after movement respectively correspond to different auxiliary input objects, switching the current target picture to display the auxiliary input object corresponding to the distance between the input interface and the operator after movement.

In this way, the automatic switching between far and near field modes is realized, which facilitates user operation to improve user experience.

In some embodiments, in addition to the embodiments of the input interface for click input in the foregoing embodiments, the input interface may also display a keyboard so that the operator can input some complex contents/characters.

As an optional embodiment, as illustrated in FIG. 3A, there is a remarks column in the input interface 302. By clicking on the remarks column, the operator 102 can further issue a new input request, and thus the input interface can be switched to an interface 402 including a keyboard, as illustrated in FIG. 4A.

Figure 4A:
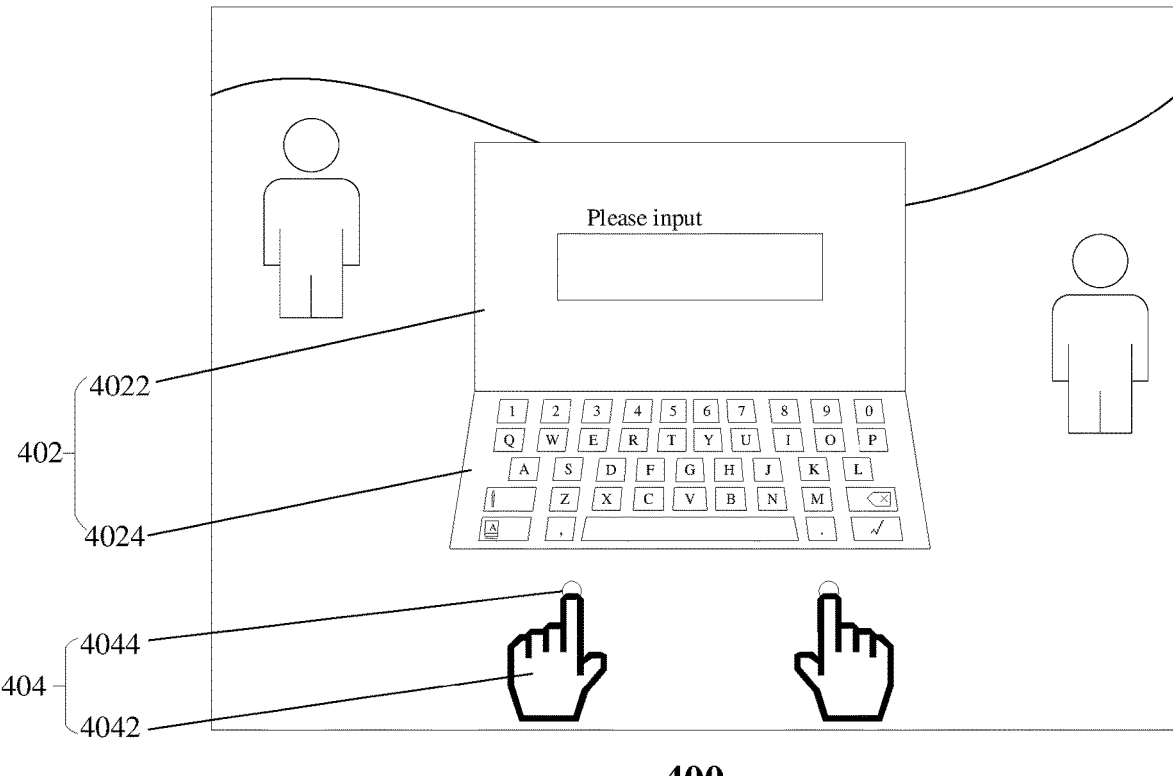
FIG. 4A illustrates a schematic diagram of an exemplary picture according to the embodiments of the present disclosure.

In FIG. 4A, the input interface 402 of the picture 400 may include two parts, wherein one part is a display interface 4022 for input content, and the other part may be a keyboard interface 4024 which includes multiple keyboard keys as triggerable objects. As illustrated in FIG. 4A, when the operator 102 adopts barehand input, the hand shape image 4042 and the pointing point 4044 can also be displayed on the picture 400 as the first object 404. The input method implemented by the operator 102 in the scene of the picture 400 is similar to the input methods of FIG. 3A and FIG. 3B, and there may be similar embodiments. No further detail will be given herein.

Figure 4B:
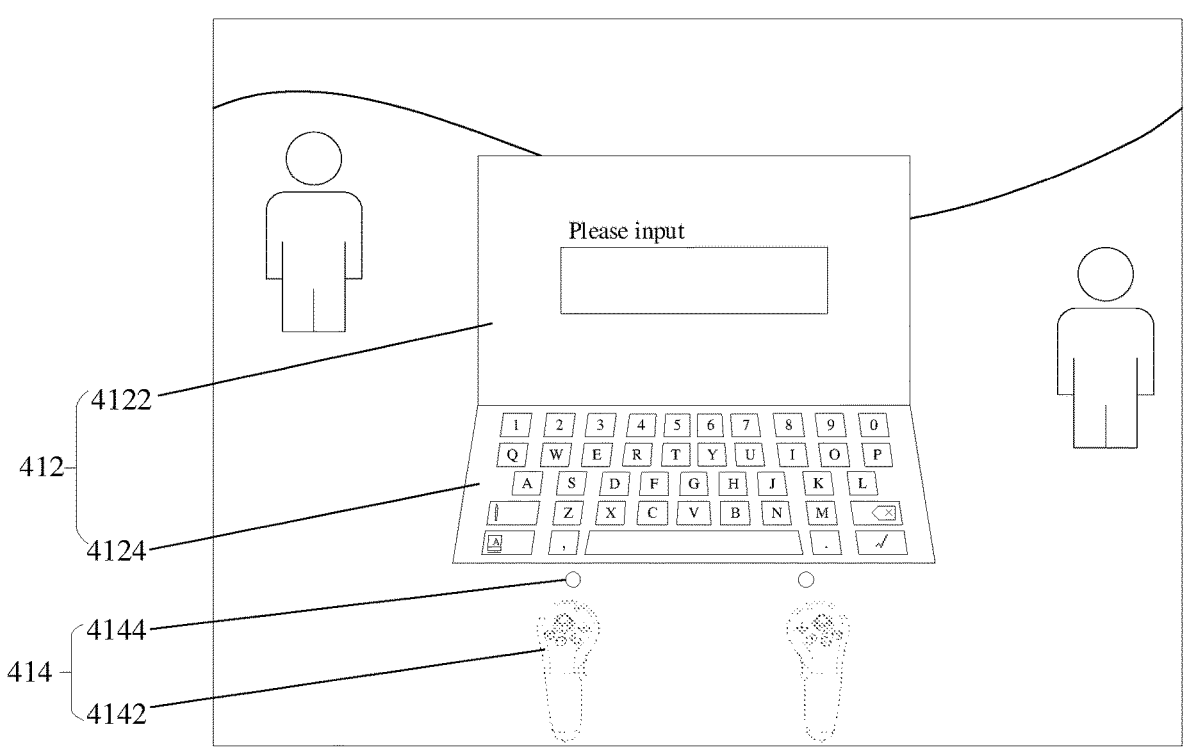
FIG. 4B illustrates a schematic diagram of an exemplary picture according to the embodiments of the present disclosure.

FIG. 4B illustrates a schematic diagram of an exemplary picture 410 according to the embodiments of the present disclosure.

As illustrated in FIG. 4B, if the operator 102 clicks on the remarks column in the input interface 312 illustrated in FIG. 3C, the picture 410 may be further displayed. In FIG. 4B, the input interface 412 of the picture 410 may also include two parts, wherein one part is a display interface 4122 for input content, and the other part may be a keyboard interface 4124 which includes multiple keyboard keys as triggerable objects. As illustrated in FIG. 4B, when the operator 102 uses a hardware input device for input, the image 4142 and the pointing point 4144 of the hardware input device can also be displayed on the picture 410 as the first object 414. The input method implemented by the operator 102 in the scene of the picture 410 is similar to the input method of FIG. 3C, and there may be similar embodiments. No further detail will be given herein.

Figure 4C:
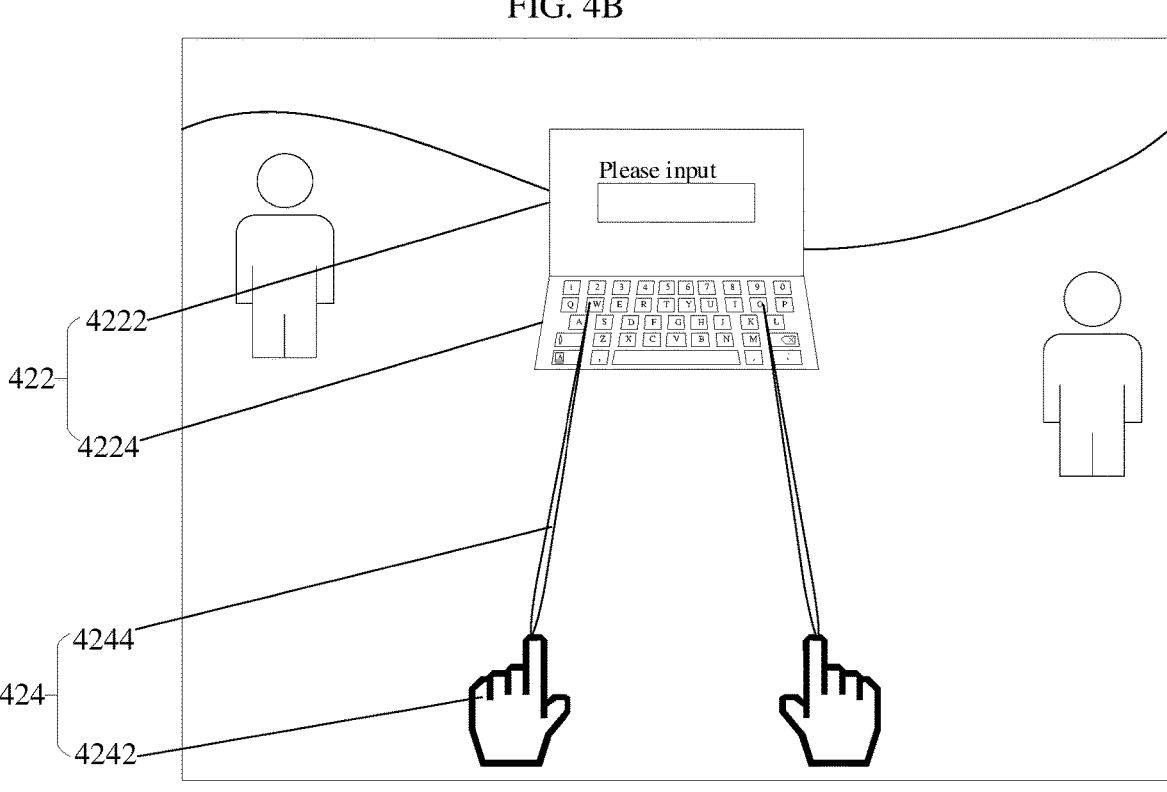
FIG. 4C illustrates a schematic diagram of an exemplary picture according to the embodiments of the present disclosure.

FIG. 4C illustrates a schematic diagram of an exemplary picture 420 according to the embodiments of the present disclosure.

As illustrated in FIG. 4C, if the operator 102 clicks on the remarks column in the input interface 322 illustrated in FIG. 3D, the picture 420 may be further displayed. In FIG. 4C, the input interface 422 of the picture 420 may also include two parts, wherein one part is a display interface 4222 for input content, and the other part may be a keyboard interface 4224 which includes multiple keyboard keys as triggerable objects. As illustrated in FIG. 4C, when the operator 102 adopts barehand input, the hand shape image 4242 and the ray 4244 pointing to the input interface 422 can also be displayed on the picture 420 as the second object 424. The input method implemented by the operator 102 in the scene of the picture 420 is similar to the input method in FIG. 3D, and there may be similar embodiments. No further detail will be given herein.

Figure 4D:
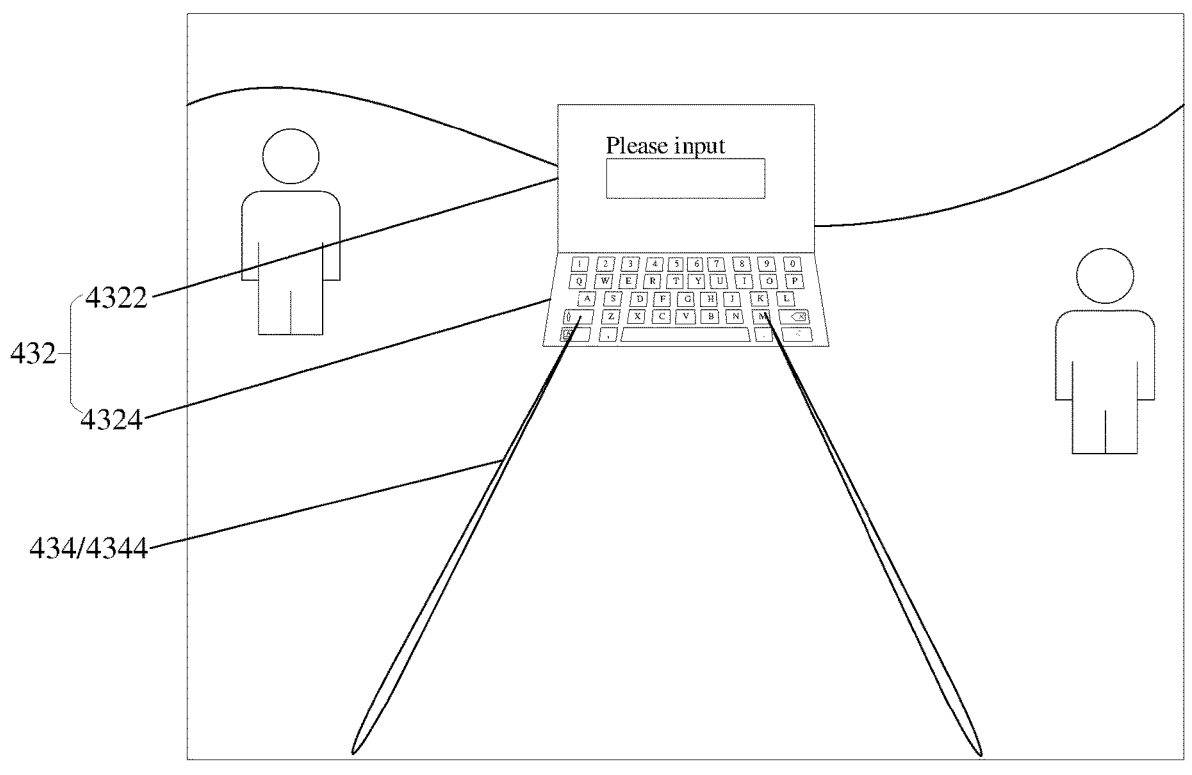
FIG. 4D illustrates a schematic diagram of an exemplary picture according to the embodiments of the present disclosure.

FIG. 4D illustrates a schematic diagram of an exemplary picture 430 according to the embodiments of the present disclosure.

As illustrated in FIG. 4D, if the operator 102 clicks on the remarks column in the input interface 332 illustrated in FIG. 3F, the picture 430 may be further displayed. In FIG. 4D, the input interface 432 of the picture 430 may also include two parts, wherein one part is a display interface 4322 for input content, and the other part may be a keyboard interface 4324 which includes multiple keyboard keys as triggerable objects. As illustrated in FIG. 4D, when the operator 102 uses a hardware input device for input, a ray 4344 pointing to the input interface 432 can also be displayed in the picture 430 as the second object 434. The input method implemented by the operator 102 in the scene of the picture 430 is similar to the input method in FIG. 3F, and there may be similar embodiments. No further detail will be given herein.

It should be noted that, except for the differences in the input interface, the embodiments illustrated in FIG. 4A to FIG. 4D have a corresponding relationship with the embodiments illustrated in FIG. 3A to FIG. 3F. For example, when a new input request (clicking on the remarks column) is received, the steps of judging the distance and the input medium can be implemented again and the input interface and auxiliary input object can be displayed according to the distance and/or the input medium, and on this basis information input can be implemented. Therefore, the embodiments illustrated in FIG. 4A to FIG. 4D may have similar specific implementations and corresponding technical effects to the embodiments illustrated in FIG. 3A to FIG. 3F. No further detail will be given herein.

In some embodiments, in addition to determining the input interface and the auxiliary input object according to at least one of the input medium and the distance between the input interface and the operator, the input interface and the auxiliary input object may also be determined based on the input intention of the operator. For example, in the case of currently being in a scene of inputting content in the remarks column (at this time, it can be recognized that the input intention of the operator is keyboard input), in order to facilitate the operator to input characters more quickly, the input interface can be displayed in the near field (as illustrated in FIG. 4A or FIG. 4B), so that the operator 102 can quickly input information by the input method of clicking.

It can be seen from the above embodiments that the input method provided by the embodiments of the present disclosure establishes a recognition model to judge the current state, and provides a keyboard interaction form that conforms to the current state; provides corresponding far and near field input solutions according to different input media, which is convenient to use for the user; and also supports switching between automatic and manual far and near field input methods. The input method provided by the embodiments of the present disclosure is simultaneously compatible with far-field and near-field interactive operations during handle input and gesture input. During near-field input, the intention of the user is simulated according to the distance and the input medium, and input by clicking or tapping is supported, which is convenient to use for the user to improve user experience.

Figure 5:
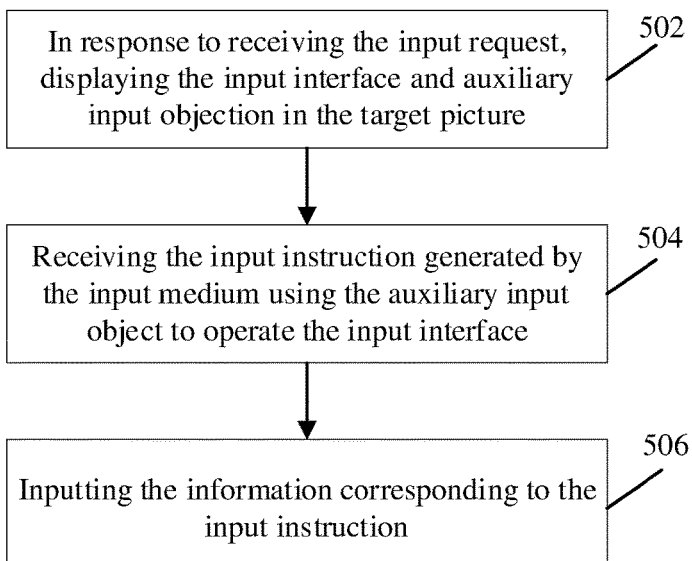
FIG. 5 illustrates a schematic diagram of an exemplary method provided by the embodiments of the present disclosure.

Embodiments of the present disclosure also provide an input method. FIG. 5 illustrates a schematic flow chart of an exemplary method 500 provided by the embodiments of the present disclosure. The method 500 can be applied to the head-mounted wearable device 104 of FIG. 1, and can also be applied to the external device 112 of FIG. 1. In some cases, the method may also be applied to devices 106, 108, and 110. As illustrated in FIG. 5, the method 500 may further include the following steps.

In step 502, in response to receiving the input request, the input interface (for example, the interface 302 of FIG. 3A, the interface 312 of FIG. 3C, the interface 322 of FIG. 3D, the interface 332 of FIG. 3F, or the interfaces 402 to 432 of FIG. 4A to FIG. 4D) and the auxiliary input object (for example, the auxiliary input object 304 of FIG. 3A, the auxiliary input object 314 of FIG. 3C, the auxiliary input object 324 of FIG. 3D, the auxiliary input object 334 of FIG. 3F, or the auxiliary input objects 404 to 434 of FIG. 4A to FIG. 4D) are displayed in the target picture (for example, the picture 300 of FIG. 3A, the picture 310 of FIG. 3C, the picture 320 of FIG. 3D, the picture 330 of FIG. 3F, or the pictures 400 to 430 of FIG. 4A to FIG. 4D). The auxiliary input object is determined according to at least one of the input medium and the distance between the input interface and the operator.

In step 504, the input instruction generated by the input medium using the auxiliary input object to operate the input interface is received.

In step 506, the information corresponding to the input instruction is inputted.

The input method provided by the embodiments of the present disclosure displays the corresponding auxiliary input object according to the input medium and/or the distance between the input interface and the operator in the simulated scene, and then receives the input instruction generated by the input medium operating the auxiliary input object to input corresponding characters, so that different input modes can be used to complete input when the current media and/or the distances between the input interface and the operator are different, thus facilitating the operation of the user.

In some embodiments, the distance between the input interface and the operator is less than the first distance (for example, 35 cm), and the auxiliary input object includes a first object (for example, the object 304 of FIG. 3A, the object 314 of FIG. 3C, or the objects 404 to 414 of FIG. 4A to FIG. 4B) for operating the input interface. In some embodiments, the distance between the input interface and the operator is greater than the second distance (for example, 50 cm), and the auxiliary input object includes a second object (for example, the object 324 of FIG. 3D, the object 334 of FIG. 3F, or the objects 424 to 434 of FIG. 4C to FIG. 4D) for operating the input interface. In this way, when the distance between the input interface and the operator is different, different auxiliary input objects can be used to assist in implementing input instructions, so that different auxiliary input objects can respectively achieve good operation experiences in different scenes (far field or near field), thus improving operation efficiency. It can be understood that the aforementioned first distance and second distance can be set according to actual needs, and the specific values are not limited. As an example, the first distance may be 35 cm, and the second distance may be 50 cm (or any other value, mainly the length of an arm).

In some embodiments, the input medium is a hardware input device, and the first object includes an image corresponding to the hardware input device (for example, the image 3142 of FIG. 3C, or the image 4142 of FIG. 4B) and a pointing point (for example, the pointing point 3144 of FIG. 3C, or the pointing point 4144 of FIG. 4B) located at the front end of the image; or the input medium is a hand of the operator, and the first object includes a hand shape image (for example, the hand shape image 3042 of FIG. 3A, or the hand shape image of FIG. 4A) and a pointing point (for example, the pointing point 3044 of FIG. 3A, or the pointing point 4044 of FIG. 4A) located at the front end of the hand shape image. Using different auxiliary input objects in different scenes can help operators achieve input operations and improve user experience.

In some embodiments, before receiving the input instruction generated by the input medium using the auxiliary input object to operate the input interface, the method further includes: determining the initial positions of the pointing point and the input interface;

receiving the input instruction generated by the input medium using the auxiliary input object to operate the input interface includes:

determining the moving distance of the input medium;

determining the moving distance of the pointing point according to the moving distance of the input medium;

according to the initial positions of the pointing point and the input interface, in combination with the moving distance of the pointing point, determining whether the pointing point is in contact with a triggerable object on the input interface; and in response to determining that the pointing point is in contact with a triggerable object on the input interface, generating the input instruction according to the contacted triggerable object, thereby realizing the near-field input operation and making the operation of the user very convenient.

In some embodiments, the input medium is a hardware input device, and the second object includes a ray (for example, the ray 3344 of FIG. 3F, or the ray 4344 of FIG. 4D) pointing to the input interface; or the input medium is a hand of the operator, and the second object includes a hand shape image and a ray (for example, the ray 3244 of FIG. 3D, or the ray 4244 of FIG. 4C) pointing from the hand shape image to the input interface. Using different auxiliary input objects in different scenes can help operators achieve input operations and improve user experience.

In some embodiments, receiving an input instruction generated by the input medium using the auxiliary input object to operate the input interface includes: in response to receiving a selection instruction sent on the basis of the input medium, generating the input instruction according to the corresponding relationship between the second object and the triggerable object on the input interface. Realizing input in combination with selection instructions can be more in line with the usage and operating habits of the user.

In some embodiments, receiving an input instruction generated by the input medium using the auxiliary input object to operate the input interface includes: in response to determining that the input medium is a hand of the operator, acquiring at least two frames of the target picture; recognizing at least two frames of hand shape images from at least two frames of the target picture respectively; recognizing the gesture of the operator according to the at least two frames of hand shape images; and in response to determining that the gesture of the operator matches a first preset gesture, determining that a selection instruction is received. Using gestures to send selection instructions can be more in line with the usage and operating habits of the user, and can also improve user experience.

In some embodiments, the input medium is a hand of the operator, and the method further includes: acquiring at least two frames of the target picture; and recognizing at least two frames of hand shape images from the at least two frames of the target picture respectively; recognizing the gesture of the operator according to the at least two frames of hand shape images; and in response to determining that the gesture of the operator matches a second preset gesture, moving the input interface in the current target picture according to the gesture of the operator. Using gestures to move the input interface can be more in line with the usage and operating habits of the user, and can also improve user experience.

In some embodiments, after moving the input interface in the current target picture according to the gesture of the operator, the method further includes: determining the distances between the input interface and the operator before movement and after movement; and in response to determining that the distances between the input interface and the operator before movement and after the movement respectively correspond to different auxiliary input objects, switching the current target picture to display the auxiliary input object corresponding to the distance between the input interface and the operator after movement, thereby realizing automatic switching between far and near fields and improving user experience.

In some embodiments, the method further includes: determining the input intention of the operator according to the input request; and displaying the input interface and the auxiliary input object in the target picture includes: according to the input intention, displaying the input interface and the auxiliary input object in the target picture, thereby expanding the scope of application.

It should be noted that the method in the embodiments of the present disclosure can be executed by a single device, such as a computer or server. The method of the embodiments can also be applied in a distributed scene, and is completed by multiple devices cooperating with each other. In this distributed scene, one device among the multiple devices can only perform one or more steps in the method of the embodiments of the present disclosure, and the multiple devices will interact with each other to complete the described method.

It should be noted that some embodiments of the present disclosure have been described above. Other embodiments are within the scope of the appended claims. In some cases, the actions or steps recited in the claims can be performed in a different order than in the aforementioned embodiments and can still achieve the desired results. Additionally, the processes depicted in the figures do not necessarily require that the desired results can only be achieved in the specific order shown or sequential order. In some implementations, multitasking and parallel processing are also possible or may be advantageous.

Figure 6:
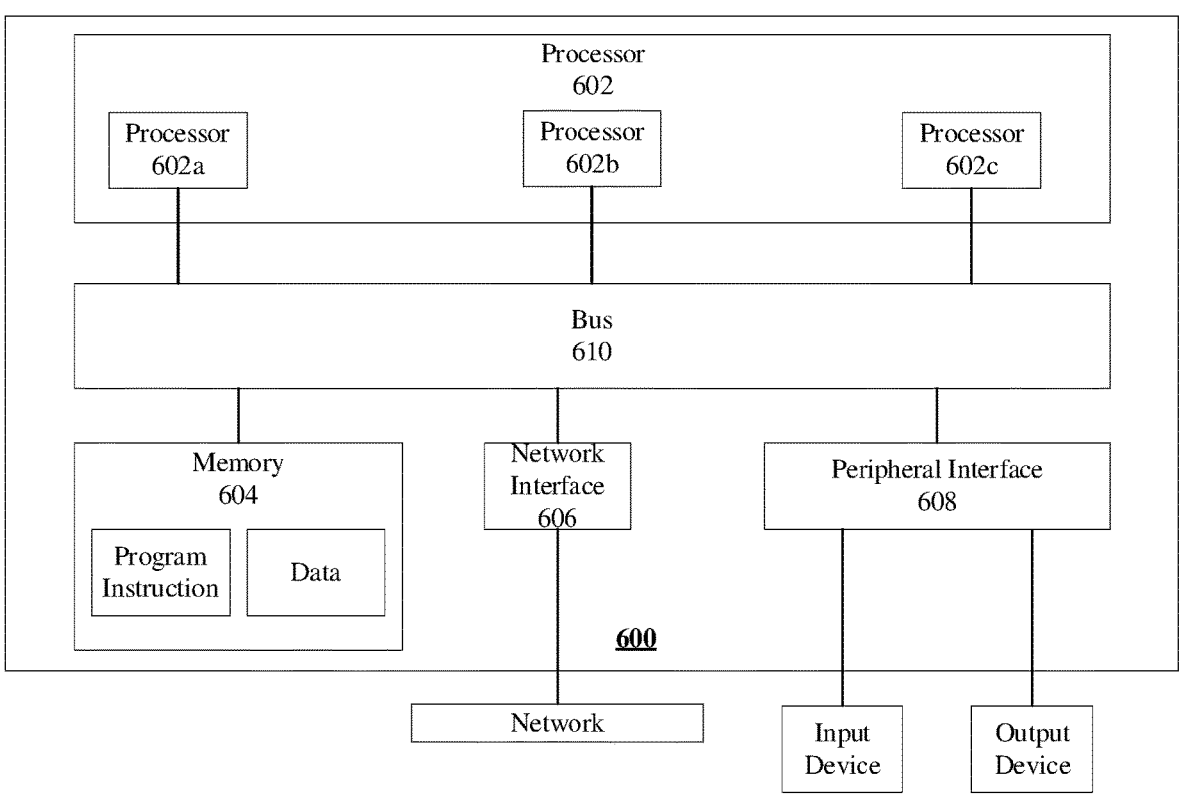
FIG. 6 illustrates a schematic diagram of the hardware structure of an exemplary computer device provided by the embodiments of the present disclosure.

Embodiments of the present disclosure also provide a computer device for implementing the above method 500. FIG. 6 illustrates a schematic diagram of the hardware structure of an exemplary computer device provided by the embodiments of the present disclosure. The computer device 600 may be used to implement the head-mounted wearable device 104 of FIG. 1, the external device 112 of FIG. 1, or the server 114 of FIG. 1. In some scenes, the computer device 600 may also be used to implement the database server 116 of FIG. 1.

As illustrated in FIG. 6, the computer device 600 may include: a processor 602, a memory 604, a network module 606, a peripheral interface 608, and a bus 610. The processor 602, the memory 604, the network module 606 and the peripheral interface 608 achieve communication connections with one another within the computer device 600 through the bus 610.

The processor 602 may be a central processing unit (CPU), an image processor, a neural network processor (NPU), a microcontroller (MCU), a programmable logic device, a digital signal processor (DSP), an application specific integrated circuit (ASIC), or one or more integrated circuits. The processor 602 may be used to perform functions related to the techniques described in the present disclosure. In some embodiments, the processor 602 may also include multiple processors integrated into a single logical component. For example, as illustrated in FIG. 6, the processor 602 may include multiple processors 602a, 602b, and 602c.

The memory 604 may be configured to store data (for example, instructions, computer codes, etc.). As illustrated in FIG. 6, the data stored in the memory 604 may include program instructions (for example, program instructions for implementing the method 500 of the embodiments of the present disclosure) and data to be processed (for example, the memory may store configuration files of other modules, etc.). The processor 602 may also access program instructions and data stored in the memory 604 and execute the program instructions to operate on data to be processed. The memory 604 may include a volatile storage device or non-volatile storage device. In some embodiments, the memory 604 may include random access memory (RAM), read only memory (ROM), optical disks, magnetic disks, hard drives, solid state drives (SSD), flash memory, memory sticks, and the like.

The network interface 606 may be configured to provide communication to the computer device 600 with other external devices via a network. The network can be any wired or wireless network capable of transmitting and receiving data. For example, the network may be a wired network, a local wireless network (for example, Bluetooth, Wi-Fi, near field communication (NFC), etc.), a cellular network, the Internet, or a combination of the above. It is understood that the type of network is not limited to the above specific examples.

The peripheral interface 608 may be configured to connect the computer device 600 with one or more peripheral devices so as to achieve information input and output. For example, peripheral devices may include input devices such as keyboards, mice, touch pads, touch screens, microphones and various sensors, as well as output devices such as displays, speakers, vibrators, and indicator lights.

The bus 610 may be configured to transmit information between various components (for example, the processor 602, the memory 604, the network interface 606, and the peripheral interface 608) of the computer device 600, such as an internal bus (for example, a processor-memory bus) and an external bus (a USB port, a PCI-E bus).

It should be noted that although the architecture of the computer device 600 above only shows the processor 602, the memory 604, the network interface 606, the peripheral interface 608 and the bus 610, during specific implementation, the architecture of the computer device 600 may also include other components necessary for implementing normal operation. In addition, those skilled in the art can understand that the architecture of the above-mentioned computer device 600 may only include components necessary for implementing the embodiments of the present disclosure, and does not necessarily include all components illustrated in the figures.

Figure 7:
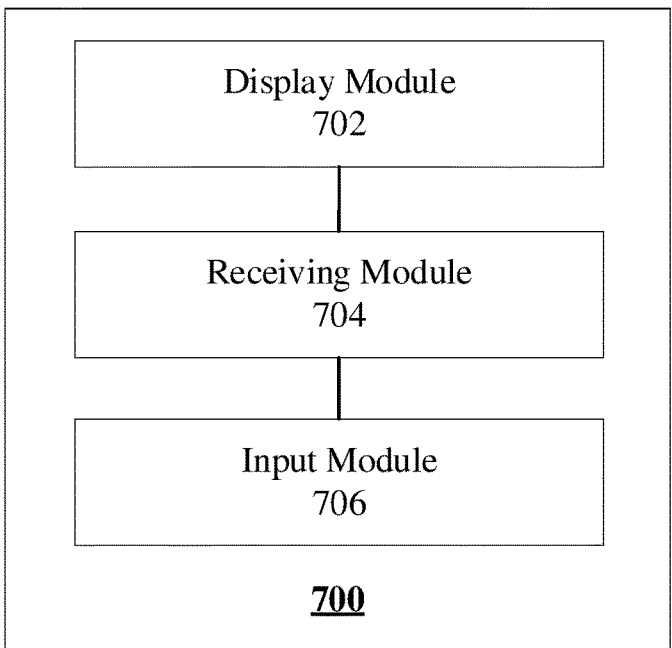
FIG. 7 illustrates a schematic diagram of an exemplary device provided by the embodiments of the present disclosure.

Embodiments of the present disclosure also provide an input device. FIG. 7 illustrates a schematic diagram of an exemplary device 700 provided by the embodiments of the present disclosure. As illustrated in FIG. 7, the device 700 can be used to implement the method 500, and can further include the following modules.

The display module 702 is configured to: in response to receiving an input request, display on a target picture (for example, the picture 300 of FIG. 3A, the picture 310 of FIG. 3C, the picture 320 of FIG. 3D, the picture 330 of FIG. 3F, or the pictures of FIG. 4A to FIG. 4D) an input interface (for example, the interface 302 of FIG. 3A, the interface 312 of FIG. 3C, the interface 322 of FIG. 3D, the interface 332 of FIG. 3F, or the interfaces 402 to 432 of FIG. 4A to FIG. 4D) and an auxiliary input object (for example, the auxiliary input object 304 of FIG. 3A, the auxiliary input object 314 of FIG. 3C, the auxiliary input object 324 of FIG. 3D, the auxiliary input object 334 of FIG. 3F, or the auxiliary input objects 404 to 434 of FIG. 4A to FIG. 4D). The auxiliary input object is determined according to at least one of the input medium and the distance between the input interface and the operator.

The receiving module 704 is configured to: receive an input instruction generated by the input medium using the auxiliary input object to operate the input interface.

The input module 706 is configured to: input information corresponding to the input instruction.

The input device provided by the embodiments of the present disclosure displays the corresponding auxiliary input object according to the input medium and/or the distance between the input interface and the operator in the simulated scene, and then receives the input instruction generated by the input medium operating the auxiliary input object so as to input corresponding characters, so that different input modes can be used to complete input when the current input media and/or the distances between the input interface and the operator are different, thus facilitating the operation of the user.

In some embodiments, the distance between the input interface and the operator is less than a first distance (for example, 35 cm), and the auxiliary input object includes a first object (for example, the object 304 of FIG. 3A, the object 314 of FIG. 3C, or the objects 404 to 414 of FIG. 4A to FIG. 4B) for operating the input interface. In some embodiments, the distance between the input interface and the operator is greater than a second distance (for example, 50 cm), and the auxiliary input object includes a second object (for example, the object 324 of FIG. 3D, the object 334 of FIG. 3F, or the objects 424 to 434 of FIG. 4C to FIG. 4D) for operating the input interface. In this way, when the distances between the input interface and the operator are different, different auxiliary input objects can be used to assist in implementing input instructions, so that different auxiliary input objects can achieve good operation experiences in different scenes (far field or near field), thus improving the operation efficiency. It can be understood that the aforementioned first distance and second distance can be set according to actual needs, and the specific values are not limited. As an example, the first distance may be 35 cm, and the second distance may be 50 cm (or any other value, mainly the length of an arm).

In some embodiments, the input medium is a hardware input device, and the first object includes an image (for example, the image 3142 of FIG. 3C, or the image 4142 of FIG. 4B) corresponding to the hardware input device and a pointing point (for example, the pointing point 3144 of FIG. 3C, or the pointing point 4144 of FIG. 4B) located at the front end of the image; or the input medium is a hand of the operator, and the first object includes a hand shape image (for example, the hand shape image 3042 of FIG. 3A, or the hand shape image 4042 of FIG. 4A) and a pointing point (for example, the pointing point 3044 of FIG. 3A, or the pointing point 4044 of FIG. 4A) located at the front end of the hand shape image. Using different auxiliary input objects in different scenes can help operators achieve input operations and improve user experience.

In some embodiments, the receiving module 704 is configured to: determine the initial positions of the pointing point and the input interface; determine the moving distance of the pointing point according to the moving distance of the input medium; determine whether the pointing point is in contact with a triggerable object on the input interface according to the initial positions of the pointing point and the input interface and in combination with the moving distance of the pointing point; and in response to determining that the pointing point is in contact with a triggerable object on the input interface, generating the input instruction according to the contacted triggerable object, thereby realizing a near-field input operation and making the operation of the user very convenient.

In some embodiments, the input medium is a hardware input device, and the second object includes a ray (for example, the ray 3344 of FIG. 3F, or the ray 4344 of FIG. 4D) pointing to the input interface; or the input medium is a hand of the operator, and the second object includes a hand shape image and a ray (for example, the ray 3244 of FIG. 3D, or the ray 4244 of FIG. 4C) pointing from the hand shape image to the input interface. Using different auxiliary input objects in different scenes can help operators achieve input operations and improve user experience.

In some embodiments, the receiving module 704 is configured to: in response to receiving a selection instruction sent on the basis of the input medium, generate the input instruction according to the corresponding relationship between the second object and the triggerable object on the input interface. Realizing input in combination with a selection instruction can be more in line with the usage and operating habits of the user.

In some embodiments, the receiving module 704 is configured to: in response to determining that the input medium is a hand of the operator, acquire at least two frames of the target picture; and recognize at least two frames of hand shape images from at least two frames of the target picture respectively; recognizing the gesture of the operator according to the at least two frames of hand shape images; and in response to determining that the gesture of the operator matches the first preset gesture, determining that a selection instruction is received. Using gestures to send a selection instruction can be more in line with the usage and operating habits of the user, and can also improve user experience.

In some embodiments, the input medium is a hand of the operator, and the display module 702 is configured to: acquire at least two frames of the target picture; and recognize at least two frames of hand shape images from at least two frames of the target picture respectively; recognize the gesture of the operator according to the at least two frames of hand shape images; and in response to determining that the gesture of the operator matches a second preset gesture, move the input interface in the current target picture according to the gesture of the operator. Using gestures to move the input interface can be more in line with the usage and operating habits of the user, and can also improve user experience.

In some embodiments, the display module 702 is configured to: determine the distances between the input interface and the operator before movement and after movement; and in response to determining that the distances between the input interface and the operator before movement and after movement respectively correspond to different auxiliary input objects, switch the current target picture to display the auxiliary input object corresponding to the distance between the input interface and the operator after movement, thereby realizing automatic switching between far and near fields and improving user experience.

In some embodiments, the display module 702 is configured to: determine the input intention of the operator according to the input request; and display the input interface and the auxiliary input object in the target picture according to the input intention, thereby expanding the scope of application.

For the convenience of description, when describing the above device, various modules are separately described depending upon functions. Of course, when implementing the present disclosure, the functions of each module can be implemented in the same or multiple software and/or hardware.

The devices of the above embodiments are used to implement the corresponding method 500 in any of the foregoing embodiments, and have the beneficial effects of the corresponding method embodiments. No further detail will be given herein.

Based on the same inventive concept and corresponding to the method of any of the above embodiments, the present disclosure also provides a non-transitory computer-readable storage medium, the non-transitory computer-readable storage medium stores computer instructions, and the computer instructions are used to enable the computer to execute the method 500 as described in any of the above embodiments.

The computer-readable medium includes permanent and non-permanent, removable and non-removable storage mediums. The storage medium may realize information storage by any method or technique. The information may be computer-readable instructions, data structures, program modules, or other data. Examples of the storage medium of the computer include but are not limited to a phase-change RAM (PRAM), a static random access memory (SRAM), a dynamic random access memory (DRAM), other types of RAMs and ROMs, an electrically erasable programmable read-only memory (EEPROM), a flash memory or other memory techniques, a compact disk read-only memory (CD-ROM), a digital versatile disc (DVD), or other optical storage, a cassette type magnetic tape, disk storage, or other magnetic storage device, or other non-transmission medium, that can be used to store information accessible by computing devices.

The computer instructions stored in the storage medium of the above embodiment are used to enable the computer to execute the method 500 as described in any previous embodiment, and have the beneficial effects of the corresponding method embodiment, which will not be repeated here.

Based on the same inventive concept, corresponding to any of the above embodiments of method 500, this disclosure also provides a computer program product, which includes a computer program. In some embodiments, the computer program may be executable by one or more processors to enable the processor to execute the method 500. Corresponding to the execution subject corresponding to each step in each embodiment of method 500, the processor executing the corresponding step may belong to the corresponding execution subject.

The computer program product of the above embodiment is used to enable the processor to execute the method 500 as described in any previous embodiment, and has the beneficial effect of corresponding method embodiments, which will not be repeated here.

Those skilled in the art should understand that the discussion of any of the above embodiments is only illustrative and not intended to imply that the scope of this disclosure (including claims) is limited to these examples; Under the ideas of this disclosure, the technical features in the above embodiments or different embodiments can also be combined, and the steps can be implemented in any order. There are many other changes in different aspects of the disclosed embodiments as described above, which are not provided in the details for simplicity.

In addition, to simplify the explanation and discussion, and to avoid making it difficult to understand the disclosed embodiments, the provided drawings may or may not show well-known power/ground connections with integrated circuit (IC) chips and other components. In addition, the apparatus can be shown in the form of a block diagram to avoid making it difficult to understand the disclosed embodiments, and this also takes into account the fact that the details of the implementation of these block diagram apparatus are highly dependent on the platform on which the disclosed embodiments will be implemented (i.e., these details should be fully within the understanding of those skilled in the art). When specific details (such as circuits) have been elaborated to describe the exemplary embodiments disclosed herein, it is obviously to those skilled in the art that, implementation of the disclosed embodiments is possible without these specific details or with changes to these specific details. Therefore, these descriptions should be considered explanatory rather than restrictive.

Although the present disclosure has been described in conjunction with specific embodiments, many substitutions, modifications, and variations of these embodiments will be apparent to those skilled in the art based on the previous description. For example, other memory architectures (such as Dynamic RAM (DRAM)) can use the discussed embodiments.

This disclosed embodiment aims to cover all such substitutions, modifications, and variations falling within the broad scope of the attached claims. Therefore, any omissions, modifications, equivalent substitutions, improvements, etc. made within the spirit and principles of this disclosed embodiment shall be included within the scope of protection of this disclosure.

What is claimed is:

1. An input method, comprising:

in response to receiving an input request, displaying an input interface and displaying an auxiliary input object in a target picture, the auxiliary input object being determined based on an input medium and a distance between the input interface and an operator, wherein the displaying the auxiliary input object in the target picture comprises:

displaying the auxiliary input object that comprises a first object for operating the input interface in response to determining that the distance between the input interface and the operator is less than a first distance, and displaying the auxiliary input object that comprises a second object for operating the input interface in response to determining that the distance between the input interface and the operator is greater than a second distance, wherein the second distance is greater than the first distance, and the second object is different from the first object;

receiving an input instruction generated by the input medium using the auxiliary input object to operate the input interface; and inputting information corresponding to the input instruction.

2. The method according to claim 1, wherein the input medium is a hardware input device, and the first object comprises an image corresponding to the hardware input device and a pointing point located at a front end of the image; or the input medium is a hand of the operator and the first object comprises a hand shape image and a pointing point located at a front end of the hand shape image.

3. The method according to claim 2, wherein before receiving an input instruction generated by the input medium using the auxiliary input object to operate the input interface, the method further comprises: determining an initial position of the pointing point and an initial position of the input interface;

receiving an input instruction generated by the input medium using the auxiliary input object to operate the input interface, comprises:

determining a moving distance of the input medium;

determining a moving distance of the pointing point according to the moving distance of the input medium;

according to the initial positions of the pointing point and the input interface and in combination with the moving distance of the pointing point, determining whether the pointing point is in contact with a triggerable object on the input interface; and in response to determining that the pointing point is in contact with the triggerable object on the input interface, generating the input instruction according to the contacted triggerable object.

4. The method according to claim 1, wherein the input medium is a hardware input device, and the second object comprises a ray pointing to the input interface; or the input medium is a hand of the operator and the second object comprises a hand shape image and a ray pointing to the input interface from the hand shape image.

5. The method according to claim 4, wherein the receiving an input instruction generated by the input medium using the auxiliary input object to operate the input interface comprises:

in response to receiving a selection instruction sent on the basis of the input medium, generating the input instruction according to a corresponding relationship between the second object and the triggerable object on the input interface.

6. The method according to claim 4, wherein the receiving an input instruction generated by the input medium using the auxiliary input object to operate the input interface comprises:

in response to determining that the input medium is a hand of the operator, acquiring at least two frames of the target picture;

recognizing at least two frames of hand shape images from at least two frames of the target picture respectively;

recognizing a gesture of the operator according to the at least two frames of hand shape images; and in response to determining that the gesture of the operator matches a first preset gesture, determining that the selection instruction is received.

7. The method according to claim 1, wherein the input medium is a hand of the operator, the method further comprises:

acquiring at least two frames of the target picture;

recognizing at least two frames of hand shape images from the at least two frames of the target picture respectively;

recognizing a gesture of the operator according to the at least two frames of hand shape images; and in response to determining that the gesture of the operator matches a second preset gesture, moving the input interface in a current target picture according to the gesture of the operator.

8. The method according to claim 7, wherein after moving the input interface in the current target picture according to the gesture of the operator, the method further comprises:

determining a distance between the input interface and the operator before movement and a distance between the input interface and the operator after movement; and in response to determining that the distances between the input interface and the operator before movement and the distances between the input interface and the operator before movement after movement respectively correspond to different auxiliary input objects, switching the current target picture to display the auxiliary input object corresponding to the distance between the input interface and the operator after movement.

9. The method according to claim 1, further comprising: determining an input intention of the operator according to the input request; and displaying the input interface and the auxiliary input object in the target picture, comprising:

displaying the input interface and the auxiliary input object in the target picture according to the input intention.

10. A computer device, comprising one or more processors, a memory; and one or more programs, wherein the one or more programs are stored in the memory, and the one or more programs, when executed by the one or more processors, cause the one or more processors to perform operations comprising:

in response to receiving an input request, displaying an input interface and displaying an auxiliary input object in a target picture, the auxiliary input object being determined based on an input medium and a distance between the input interface and an operator, wherein the displaying the auxiliary input object in the target picture comprises:

displaying the auxiliary input object that comprises a first object for operating the input interface in response to determining that the distance between the input interface and the operator is less than a first distance, and displaying the auxiliary input object that comprises a second object for operating the input interface in response to determining that the distance between the input interface and the operator is greater than a second distance, wherein the second distance is greater than the first distance, and the second object is different from the first object;

receiving an input instruction generated by the input medium using the auxiliary input object to operate the input interface; and inputting information corresponding to the input instruction.

11. The computer device according to claim 10, wherein the input medium is a hardware input device, and the first object comprises an image corresponding to the hardware input device and a pointing point located at a front end of the image; or the input medium is a hand of the operator and the first object comprises a hand shape image and a pointing point located at a front end of the hand shape image.

12. The computer device according to claim 11, wherein before receiving an input instruction generated by the input medium using the auxiliary input object to operate the input interface, the method further comprises: determining an initial position of the pointing point and an initial position of the input interface;

receiving an input instruction generated by the input medium using the auxiliary input object to operate the input interface, comprises:

determining a moving distance of the input medium;

determining a moving distance of the pointing point according to the moving distance of the input medium;

according to the initial positions of the pointing point and the input interface and in combination with the moving distance of the pointing point, determining whether the pointing point is in contact with a triggerable object on the input interface; and in response to determining that the pointing point is in contact with the triggerable object on the input interface, generating the input instruction according to the contacted triggerable object.

13. The computer device according to claim 10, wherein the input medium is a hardware input device, and the second object comprises a ray pointing to the input interface; or the input medium is a hand of the operator and the second object comprises a hand shape image and a ray pointing to the input interface from the hand shape image.

14. The computer device according to claim 13, wherein the receiving an input instruction generated by the input medium using the auxiliary input object to operate the input interface comprises:

in response to receiving a selection instruction sent on the basis of the input medium, generating the input instruction according to a corresponding relationship between the second object and the triggerable object on the input interface.

15. The computer device according to claim 10, wherein the input medium is a hand of the operator, the operations further comprise:

acquiring at least two frames of the target picture;

recognizing at least two frames of hand shape images from the at least two frames of the target picture respectively;

recognizing a gesture of the operator according to the at least two frames of hand shape images; and in response to determining that the gesture of the operator matches a second preset gesture, moving the input interface in a current target picture according to the gesture of the operator.

16. A non-volatile computer-readable storage medium comprising a computer program, wherein when the computer program is executed by one or more processors, the computer program causes the one or more processors to execute operations comprising:

in response to receiving an input request, displaying an input interface and displaying an auxiliary input object in a target picture, the auxiliary input object being determined based on an input medium and a distance between the input interface and an operator, wherein the displaying the auxiliary input object in the target picture comprises:

displaying the auxiliary input object that comprises a first object for operating the input interface in response to determining that the distance between the input interface and the operator is less than a first distance, and displaying the auxiliary input object that comprises a second object for operating the input interface in response to determining that the distance between the input interface and the operator is greater than a second distance, wherein the second distance is greater than the first distance, and the second object is different from the first object;

receiving an input instruction generated by the input medium using the auxiliary input object to operate the input interface; and inputting information corresponding to the input instruction.

17. The non-volatile computer-readable storage medium according to claim 16, wherein the input medium is a hand of the operator, and the operations further comprise:

acquiring at least two frames of the target picture;

recognizing at least two frames of hand shape images from the at least two frames of the target picture respectively;

recognizing a gesture of the operator according to the at least two frames of hand shape images; and in response to determining that the gesture of the operator matches a second preset gesture, moving the input interface in a current target picture according to the gesture of the operator.

18. The non-volatile computer-readable storage medium according to claim 16, the operations further comprising:

determining an input intention of the operator according to the input request; and displaying the input interface and the auxiliary input object in the target picture according to the input intention.

* * * * *